United States Patent [19]

Ito et al.

[11] Patent Number: 4,756,959
[45] Date of Patent: Jul. 12, 1988

[54] SHEET FOR USE IN FIRING BASE PLATES

[75] Inventors: Toshikuni Ito, Aichi; Koichi Morimoto, Iwakura; Fukashi Hashimoto, Gifu; Yoshio Hayashi, Gifu; Riichiro Ieda, Gifu, all of Japan

[73] Assignees: Ishizuka Garasu Kabushiki Kaisha, Nagoya; Daito Kako Kabushiki Kaisha, Gifu; Nagara Seishi Kabushiki Kaisha, Motosu; Kabushiki Kaisha Hayashi Takatoshi Shyoten, Gifu, all of Japan

[21] Appl. No.: 16,288

[22] Filed: Feb. 19, 1987

[30] Foreign Application Priority Data

Feb. 20, 1986 [JP] Japan .................................. 61-36147
Aug. 19, 1986 [JP] Japan .................................. 61-193829
Sep. 20, 1986 [JP] Japan .................................. 61-222932

[51] Int. Cl.$^4$ ........................ B32B 18/00; B32B 5/16; F27D 3/12; F27D 5/00
[52] U.S. Cl. ............................ 428/323; 428/325; 428/328; 428/329; 428/414; 428/515; 428/537.5; 264/58; 432/241; 432/258
[58] Field of Search ............... 428/323, 325, 328, 329, 428/331, 408, 414, 515, 537.5; 432/6, 258, 259; 264/58

[56] References Cited

U.S. PATENT DOCUMENTS

| 3,179,724 | 4/1965 | Jones | 264/58 |
| 3,499,634 | 3/1970 | Rea | 432/258 |
| 4,042,748 | 8/1977 | Hebbel et al. | 428/323 |
| 4,146,670 | 3/1979 | Rogers | 428/323 |
| 4,608,311 | 8/1986 | Giles, Jr. et al. | 428/415 |

FOREIGN PATENT DOCUMENTS

| 236006 | 9/1987 | European Pat. Off. . |
| 3534886 | 4/1986 | Fed. Rep. of Germany ........ 264/58 |
| 58-99163 | 6/1983 | Japan . |
| 182727 | 8/1985 | Japan . |
| 60-8991 | 8/1985 | Japan . |
| 61-56188 | 3/1986 | Japan . |
| 49188 | 3/1987 | Japan .................... 432/241 |

Primary Examiner—John E. Kittle
Assistant Examiner—Susan S. Rucker
Attorney, Agent, or Firm—Cushman, Darby & Cushman

[57] ABSTRACT

The present invention relates to a sheet which may be used in firing ceramic faced base plates, glass faced base plates and metal faced base plates. The sheet comprises a combustible sheet such as a pulp paper and a coating layer coated on at least one surface of the combustible sheet. The coating layer comprises a powder of a material with a high melting point and a powder of carbon which may be formed separately from the layer comprising the powder of a material having a high melting point. The coating layer comprising the powder of carbon effectively prevents shrinkage of the sheet during firing, and thus prevents adhesion between adjacent stacked base plates and between the base plates and the supporting base. The sheet of the present invention further provides a layer of a uniform breadth which prevents the formation of undulations and pin-holes in the base plates during firing.

35 Claims, 2 Drawing Sheets

SHEET FOR USE IN FIRING BASE PLATES

BACKGROUND OF THE INVENTION

1. Field of the Invention

The present invention relates to a sheet which may be used in firing ceramic faced base plates, metal faced base plates and glass faced base plates. More specifically, the present invention relates to a sheet which may be placed between adjacent stacked base plates and between the base plates and the supporting base during firing to prevent adhesion. The sheet additionally prevents the formation of undulations and pin-holes in the base plates during firing.

2. Description of the Prior Art

When ceramic faced base plates are fired according to the conventional method, a powder of material with a high melting point, such as $Al_2O_3$ is scattered on the ceramic faced base plates by hand, following which ceramic faced base plates are stacked in a vertical direction and fired. However, due to the uneven scattering effect obtained by this method, undulations and pin-holes form in the ceramic faced base plates during firing. In addition, inferior products are often produced due to the adhesion of $Al_2O_3$ powder to undesirable portions of the ceramic faced base plates. Furthermore, the method of scattering the powder on the base plates by hand increases the cost of production.

Japanese Patent Publication SHO No. 60-8991 proposes a sheet which comprises a powder of $Al_2O_3$ or $ZrO_2$ scattered within a paper or plastic sheet to overcome the above-described drawbacks in the method of scattering a the powder with a high melting point on the base plates by hand. However, such a sheet shrinks considerably during firing according to the type of the sheet used. As a result, the peripheral portions of the ceramic faced base plates often adhere to each other during and following firing. To prevent such adhesion, the sheet thus comprising the powder must be increased in size by the estimated amount of shrinkage expected during firing and this estimation is very difficult.

During firing, the stacked ceramic faced base plates are usually placed on a supporting base. Metal-faced base plates, which are constructed by pressing a powder of a metal such as cemented carbide into the form of a plate, may also be stacked and fired. During firing, the stacked metal-faced base plates are usually put on a supporting base, as in the case of the ceramic faced base plate. Since ceramics-faced base plates and metal-faced base plates shrink during firing, the bottom surface of the stacked base plates becomes scratched due to abrasion with the surface of the supporting base, thereby producing an inferior product. Even in the case of placing the sheet comprising a powder scattered within a paper, as disclosed by Japanses Patent Publication SHO No. 60-8991, between the stacked ceramic faced or metal faced base plates and the supporting base, the lubricating effect of said sheet is insufficient to prevent abrasion. In particular, almost no lubricating effect may be expected in the case of metal-faced base plates.

SUMMARY OF THE INVENTION

It is a primary object of the present invention to provide a sheet which may be used in firing ceramic faaced base plates, glass faced base plates and metal faced base plates, which sheet is not likely to shrink during firing.

It is another object of the present invention to provide a sheet which may be used in firing ceramic faced base plates, glass faced base plates and metal faced base plates, which sheet prevents adhesion between adjacent stacked base plates and between the base plates and the supporting base.

It is a further object of the present invention to provide a sheet which may be used to prevent formation of undulations and pin-holes in ceramic faced base plates, glass faced base plates and metal-faced base plates during firing.

The sheet of the present invention may be of the following structures.

(1) The sheet of the present invention which may be used to fire ceramic faced base plates may comprise (1) a combustible sheet, and (2) a coating layer coated on at least one surface of the combustible sheet, the coating layer comprising (a) a powder of ceramics with a high melting point selected from the group consisting of $Al_2O_3$ and $ZrO_2$ and (b) a powder of carbon. This sheet corresponds to a first embodiment of the present invention.

(2) The sheet of the present invention which may be used to fire ceramic faced base plates, glass faced base plates and metal faced base plates may comprise (1) a combustible sheet, and (2) a coating layer coated on at least one surface of the combustible sheet, the coating layer comprising (a) a powder of at least one kind of ceramics selected from the group consisting of a nitride, a carbonide (carbide), and a ferrite and (b) a powder of carbon. This sheet corresponds to a second embodiment of the present invention.

(3) The sheet of the present invention which may be used to fire ceramic faced base plates may comprise (1) a combustible sheet, and (2) first coating layers coated on both surfaces of the combustible sheet and a second coating layer comprising a powder of a material having a high melting point coated on a surface of at least one of the first coating layers. This sheet corresponds to a third embodiment of the present invention.

(4) The sheet of the present invention which may be used to fire ceramic faced base plates may alternatively comprises (1) a combustible sheet, and (2) a coating layer coated on at least one surface of the combustible sheet, the coating layer comprising (a) a powder of a material having a high melting point in an amount of 0.5% to 25% by weight, (b) a powder of carbon in an amount of 5% to 90% by weight, (c) a dispersing agent in an amount of 0.1 to 8% by weight, and (d) a binder forming the remainder of the coating layer.

Because the coating layer which includes the powder of carbon is coated on the surface of the combustible sheet according to the method of the present invention, the remaining between the stacked ceramic faced base plates, glass faced base plates or metal faced base plates following incineration of the combustible sheet, has a uniform breadth. Accordingly, undulations and pin-holes are prevented from forming in said base plates during firing. Furthermore, since the powder of carbon included in the coating layer prevents shrinkage of the sheets, adhesion between the peripheral portions of the ceramic faced base plates, glass faced base plates or metal faced base plates and between the base plates and the supporting base are prevented.

BRIEF DESCRIPTION OF THE DRAWINGS

These and other objects and advantages of the present invention will become apparent from the following detailed description of the presently preferred exemplary embodiments of the invention taken in conjunction with the accompanying drawings, wherein.

DESCRIPTION OF THE PREFERRED EMBODIMENTS

A. FIRST EMBODIMENT

Figure 1:
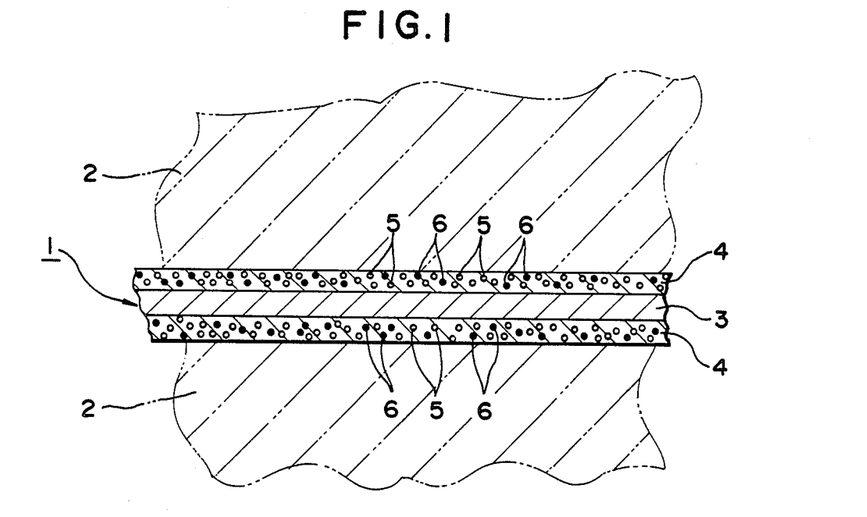
FIG. 1 is a sectional view of a sheet which may be used in firing ceramic faced base plates according to the first embodiment of the present invention.

Referring now to the drawings, there is illustrated in FIG. 1, a sheet 1 which may be used in firing ceramic faced base plates 2 according to a first embodiment of the prevent invention. The sheet 1 is placed between the ceramic faced base plates 2 during firing. The sheet 1 comprises a combustible sheet 3 and a coating layer 4 which is coated on at least one surface of the combustible sheet 3. The coating layer 4 includes a powder of ceramics 5 with a high melting point which is selected from the group consisting of and $Al_2O_3$ $ZrO_2$ and a powder of carbon 6.

The combustible sheet 3 is preferably composed of a pulp paper which may be entirely incinerated when the ceramic faced base plates 2 are fired. The combustible sheet 3 may be composed of a sheet of combustible plastics, such as polyvinyl alcohol. The powder of ceramics 5 with a high melting point, such as a powder of $Al_2O_3$ and $ZrO_2$ and the powder of carbon 6 are mixed together with an organic binder. The mixture is then coated on the surface of the combustible sheet 3. The coating layer 4 is preferably coated on both surfaces of the combustible sheet 3 as shown in FIG. 1. Alternatively, the coating layer 4 may be coated on one surface of the combustible sheet 3. The coating layer 4 preferably comprises 25% to 90% by weight of the powder of ceramics 5 and 5% to 70% by weight of the powder of carbon 6 which are mixed with 5% to 30% by weight of an organic binder. The powder of ceramics 5 functions to prevent the ceramic faced base plates 2 from adhering to each other during firing. If the coating layer 4 comprises the powder of ceramics 5 in an amount less than 25% by weight, the adhesion-preventing effect of the powder of ceramics is no longer satisfactory. If the coating layer 4 comprises the powder of ceramics 5 in an amount greater than 90% by weight, an even surface of the coating layer 4 is difficult to obtain and the ratio of the powder of carbon 6 to the powder of ceramics 5 included in coating layer 4 decreases, which results in decreasing the effects of the powder of carbon 6 described below.

The powder of carbon 6 functions to inhibit shrinkage of the entire sheet 1 during firing to such an extent that the shrinkage rate of the sheet 1 is substantially the same as that of alumina-faced base plates, which are a typical example of ceramic faced base plates 2. If the coating layer 4 comprises the powder of carbon 6 in an amount less than 5% by weight, the shrinkage-inhibiting effect of the powder of carbon 6 is no larger satisfactory. If the coating layer 4 comprises the powder of carbon 6 in an amount greater than 70% by weight, it is difficult to coat the coating layer 4 on at least are surface of the combustible sheet 3.

As the organic binder, an acrylic resin binder may be used. Any kind of organic binder may be used that does not have an undesirable effect on the ceramic faced plates 2 during firing.

The sheet 1 thus constructed is placed between the ceramic faced base plates 2 which are stacked in a vertical direction during the firing of the ceramic faced base plates 2. The combustible sheet 3 will be incinerated during the diring due to the high temperatures, leaving the powder of ceramics 5 with a high melting point remaining between the ceramic faced base plates 2. This powder of ceramics 5 functions to prevent adhesion between the ceramic faced base plates 2, obtaining improved results over the powder of ceramics of the prior art which is scattered by hand on the ceramic faced base plates prior to firing.

The sheet 1 of the present invention has additional advantages. Because the sheet 1 of the first embodiment of the present invention is constructed by coating the coating layer 4 on at least one surfaces of the combustible sheet 3, a constant breadth of the coating layer 4 may be easily obtained and the construction of the sheet 1 is very easy, which results in a decrease in costs. Since the coating layer 4 comprises the powder of carbon 6 in an amount of 5% to 70% by weight, the sheet 1 shrinks only to substantially the same extent as the ceramic faced base plates 2. As a result, the adhesion between the peripheral portions of the ceramic faced base plates 2 firing of ceramic faced base plates is effectively prevented. Furthermore, the surface of the sheet 1 which may be used in firing ceramic faced base plates according to the present invention is flat; the construction of an uneven surface and the formation of pin-holes in the ceramic faced base plates 2 during firing are effectively prevented.

An example of the first embodiment of the present invention is described below.

A powder of ceramics 5 of $Al_2O_3$ having a grain size of 10–50 microns and in an amount of 55% by weight a powder of carbon 6 having about the same grain size in an amount of 35% by weight were mixed together with an organic binder of acrylic resin in an amount of 10% by weight. The mixture was then coated on both surfaces of a combustible sheet 3 composed of 100% pulp paper having a width of about 1 mm and then dried to form the coating layers 4. The sheet thus constructed was cut to a square sheet having dimensions of 128 mm by 128 mm to form a sheet 1 which may be used in firing ceramic faced base plates according to the present invention. Eight ceramic faced based plates 2, each having dimensions of 128 mm by 128 mm and a width of 1.2 mm, were stacked in a vertical direction with sheets 1 separating adjacent ceramic faced base plates 2. The ceramic faced base plates 2 were then fired. Undulation in ceramic faced base plates 2 thus fired were measured and compared with those of ceramic faced base plates of the same material and the same dimensions which were fired with a ceramics powder scattered by hand on the ceramic faced base plates, according to the method of the prior art. TABLE 1 below shows the results of the measurements of undulations taken at the span of 80 mm.

TABLE 1

| Undulations of Ceramic Faced Base Plates | | |
|---|---|---|
| | First Embodiment of the Present Invention | Prior Art |
| Maximum | 30.6 microns | 59.7 microns |
| Minimum | 5.9 microns | 31.3 microns |
| R | 24.7 microns | 28.4 microns |
| x | 20.2 microns | 47.0 microns |
| σn-1 | 7.6 microns | 9.5 microns |

As may be seen from TABLE 1, the fired ceramic faced base plates 2 of the first embodiment of the present invention show a superior eveness of surface over that obtained by the prior art.

In summary, the first embodiment of the present invention provides a number of advantages, including the following. First, due to the shrinkage-inhibiting effect of the powder of carbon 6, adhesion between the peripheral portions of the ceramic faced base plates 2 which takes place in conventional firing of ceramic faced base plates is prevented. Second, due to the constant breadth of the layer of the powder of ceramics 5 remaining between the ceramic faced base plates 2, undulations and pin-holes in the ceramic faced base plates 2, formed during firing, are effectively prevented. Third, due to the construction of the sheet 1 wherein the coating layer 4 of a constant breadth is coated on the combustible sheet 3, the construction of the sheet 1 which may be used in firing ceramics faced base plates according to the present invention is easy, resulting in a decrease in costs.

B. SECOND EMBODIMENT

Figure 2:
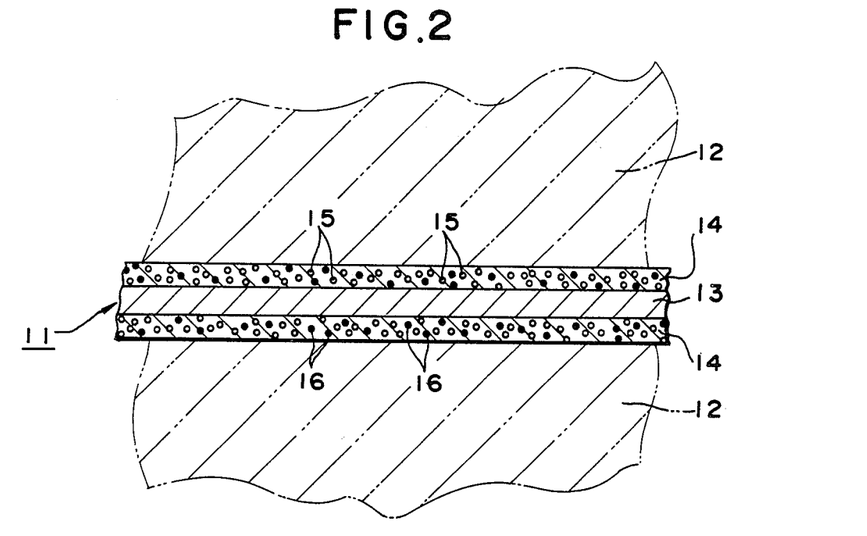
FIG. 2 is sectional view of a sheet which may be used in firing ceramic faced base plates, metal faced base plates and glass faced base plates according to the second embodiment of the present invention.

FIG. 2 illustrates a sheet 11 which may be used in firing base plates according to a second embodiment of the present invention. According to the second embodiment, a base plate 12 may be constructed by pressing a powder of ceramics, a powder of metal, such as cemented carbide, or a powder of glass into the form of a plate. The sheet 11 is placed between the stacked base plates 12 during firing. The sheet 11 comprises a combustible sheet 13 and a coating layer 14 which is coated on at least one surface of the combustible sheet 13. The coating layer 14 comprises a powder of at least one type of ceramics 15 selected from the group consisting of nitride, carbonide and ferrite and a powder of carbon 16.

The combustible sheet 13 is preferably constructed of a pulp paper which may be entirely incinerated when the plates 12 are fired. The combustible sheet 13 may be composed of a sheet of combustible plastics, such as polyvinyl alcohol. A powder of ceramics 15 and a powder of carbon 16 which have been mixed together with an organic binder are coated on one or both surfaces of the combustible sheet 13. The powder of ceramics 15 which is included in the coating layer 14 comprises a nitride, such as BN, AlN, or $Si_3N_4$, a carbonide such as SiC, a ferrite such as Mn-Zn, Ni-Zn or an arbitrary combination thereof. Generally speaking, the heat durability characteristics of a carbonide are superior to those of a nitride which are superior to those of an oxide. These ceramics have better heat durability characteristics than those of $Al_2O_3$. In particular, BN may be used as a mould release agent for glass. BN also has excellent lubricating characteristics with respect to glass. Thus, BN is preferably used as the powder of ceramics included in the sheet 11 which may be used in firing such base plates that are constructed by pressing a powder of glass into the form of a plate.

The coating layer 14 preferably comprises a powder of ceramics 15 in an amount of 25% to 95% by weight and a powder of carbon 16 in an amount of 3% to 70% by weight which are mixed with an organic binder in an amount of 3% to 30% by weight. The powder of ceramics 15 functions to prevent the base plates 12 from adhering to each other during firing, as well as functioning to provide lubrication between the base plates 12. If the coating layer 4 comprises the powder of ceramics 15 in an amount less than 25% by weight, the adhesion preventing and lubricating effects of the powder of ceramics 15 are no layer satisfactory. If the coating layer 14 comprises the powder of ceramics 15 in an amount greater than 95% by weight, an even surface of the coating layer 14 is difficult to obtain and, in addition, the ratio of the powder of carbon 16 to the powder of ceramics 15 included in the coating layer 14 decreases, which results in decreasing the effects of the powder of carbon 16 described below. The powder of ceramics 15 may be a powder of an oxide, such as $Al_2O_3$ or $ZrO_2$.

The powder of carbon 16 functions to prevent shrinkage of the entire sheet 11 during firing to such an extent that the shrinkage rate of the sheet 11 is substantially the same as that of alumina base plates, which are a typical example of ceramics base plates 2. The powder of carbon 16 further functions to provide lubrication between the base plates 12. If the coating layer 14 comprises the powder of carbon 16 in an amount less than 3% by weight, the shrinkage inhibiting effect of the powder of carbon 16 is no larger satisfactory. If the coating layer 14 comprises the powder of carbon 16 in an amount greater than 70% by weight, it becomes difficult to coat the coating layer on at least one surface of the combustible sheet 13.

As the organic binder, an acrylic resin binder may be used. Any organic binder may be used that does not have an undesirable effect on the base plates 12 during firing.

The base plates 12 are constructed by pressing a powder of ceramics, a powder of glass, or a powder of metal such as cemented carbide into the form of a plate. The sheet 11 is placed between adjacent base plates 12 which are stacked in a vertical direction or between the base plate 12 and the supporting base that supports the stacked base plates 12. The combustible sheet 13 will be incinerated during the firing of the base plates due to the high temperatures, leaving the powder of ceramics 15 with a high melting point and the powder of carbon 16 between the base plates 12 and between the base plates 12 and the supporting base. These remaining powders of ceramics and carbon function to prevent adhesion between the base plates 12 and between the stacked base plates 12 and the supporting base, and furthermore, provide lubrication between them to prevent abrasion between them.

The sheet 11 of the present invention has additional advantages. Because the sheet 11 of the second embodiment of the present invention is constructed by coating the coating layer 14 on at least one surface of the combustible sheet 13, a constant breadth of the coating layer 14 may be easily obtained and the construction of the sheet 11 is very easy, which results in a decrease in costs. Since the coating layer 14 comprises the powder of carbon 16 in an amount of 3% to 70% by weight, the sheet 11 shrinks only to about the same extent as the ceramics base plates 12. As a result, the adhesion between the base plates 12 at the peripheral portions of the base plates 12 which takes place in conventional firing of base plates is effectively prevented. Furthermore, the surface of the sheet 11 which may be used in firing base plates according to the present invention is flat; the construction of an uneven surface or the formation of pin-holes in the base plates 12 during firing are effectively prevented.

Two examples of the second embodiment of the present invention are described below.

According to the first example of the second embodiment of the present invention, a powder of ceramics 15 of BN having an average grain size of 10 microns and in an amount of 60% by weight a powder of carbon 16 having an average grain size of 3 microns and in an amount of 35% by weight were mixed together with an organic binder in an amount of 5% by weight. The mixture was than coated on one surface of a combustible sheet 3 composed of combustible plastics and then dried to form a coating layer 14. The sheet 11 thus constructed was placed between the stacked base plates 12 which were constructed by pressing a powder of glass into the form of a plate and the supporting base. The base plates 12 were then fired. Following firing, no scratches could be found on the bottom surface of the base plate 12 and no adhesion between base plate 12 and the supporting base occurred.

According to the second example of the second embodiment of the present invention, a powder of ceramics 15 of a Ni-Zn type ferrite having an average grain size of 5 microns and in an amount of 80% by weight and a powder of carbon 16 in an amount of 10% by weight were mixed together with an organic binder in an amount of 10% by weight. The mixture was then coated on both surfaces of a combustible sheet 13 composed of a pulp paper having a thickness of 0.3 mm and then dried to form the coating layers 14. The sheet 11 thus constructed was placed between the stacked base plates 12 which were constructed by pressing a powder of cemented carbide into the form of a plate and the supporting base. The base plates 12 were then fired. Following firing, no scratches due to thermal shrinkage could be found on the bottom surface of the base plate 12. Furthermore, undulations in the base plate 12 were decreased to ⅓ or less than those of conventionally fired base plates.

In summary, the second embodiment of the present invention provides a number of advantages, including the following. First, due to the shrinkage-inhibiting effect of the powder of carbon 6 and the lubricating effect of the powder of ceramics 15 and the powder of carbon 16, adhesion between the plates 12 and the supporting base during firing and scratching of the base plates due to abrasion between the base plates 12 and the supporting base during firing are effectively prevented. Second, due to the constant breadth of the layer of powder of ceramics 15 remaining between the base plates 12, undulations and pin-holes in the base plates 12, formed during firing, are effectively prevented. Third, due to the construction of the sheet 11 wherein the coating layer 14 of a constant breadth is coated on the combustible sheet 13, the construction of the sheet 11 which may used in the firing of ceramics base plates according to the present invention becomes easy, resulting in a decrease in costs.

C. THIRD EMBODIMENT

Figure 3:
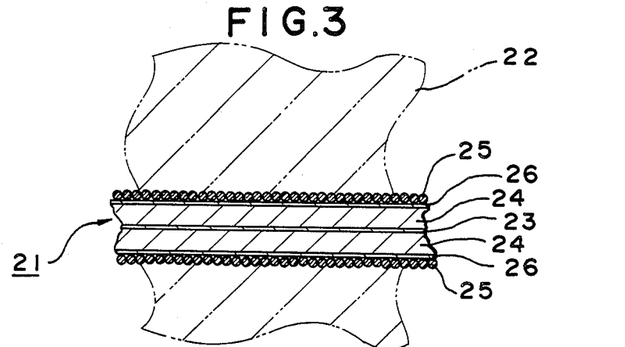
FIG. 3 is a sectional view of a sheet which may be used in firing ceramic faced base plates according to the third embodiment of the present invention.

FIG. 3 illustrates a sheet 21 which may be used in firing ceramic faced base plates according to a third embodiment of the present invention. The sheet 21 is placed between the ceramic faced base plates 22 during firing. The sheet 21 comprises a combustible sheet 23, a first coating layer 24 comprising a powder of carbon, which coating layer 24 is coated on both surfaces of the combustible sheet 23, and a second coating layer 25 comprising a powder of a material with a high melting point, which coating layer 25 is coated on a surface of at least one of the first coating layer 24.

The combustible sheet 23 is preferably constructed of a pulp paper which may be entirely incinerated when the ceramic faced base plates 22 are fired. The combustible sheet 23 may be constructed of a sheet of combustible plastics, such as polyvinyl alcohol. The first coating layer 24, coated on both surfaces of the combustible sheet 23, comprises a powder of carbon and a binder therefore and the thickness of each first coating layer 24 is 15–50 microns. The first coating layer 24 comprising a powder of carbon functions to carbonize the combustible sheet 23 during firing and to essentially prevent shrinkage of the sheet 21 during firing. The second coating layer 25 comprising a powder of a material with a high melting point is attached to the surface of the first coating layer 24 with an adhesive layer 26 of an acrylic resin adhesive or an epoxy resin adhesive. The material with a high melting point, used in forming the powder of the second coating layer 25, is selected either from a ceramics having a high melting point, such as alumina, zirconia, silicon carbide, silicon nitride, aluminum nitride and boron nitride, or from a ferrite, such as manganese-zinc and nickel-zinc.

Figure 4:
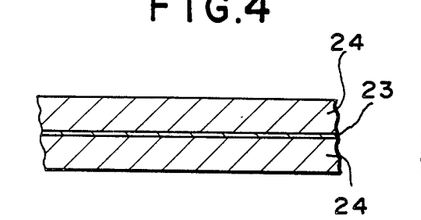
FIG. 4 is a sectional view of the sheet of FIG. 3 in the first stage of construction of the sheet.
Figure 5:
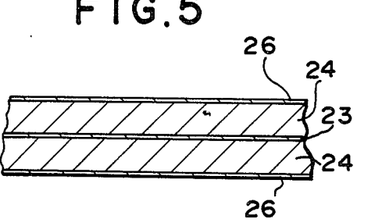
FIG. 5 is a sectional view of the sheet of FIG. 3 in the second stage of construction of the sheet.

FIG. 4 illustrates a pre-sheet wherein the first coating layers 24 comprising a powder of carbon are coated on both surfaces of the combustible sheet 23. Upon receiving an order, the pre-sheet is cut to a specified size, that is, before the coating of the second coating layer 25. The adhesive layer 26 is then coated on the surface of the first coating layer 24 as shown in FIG. 5. The powder of a material with a high melting point is attached to the first coating layer 24 via the adhesive layer 26 by means of electrostatic coating or flow dipping coating. This, the manufacture of sheet 21 may correspond to the specification of an order by the election of a material of a high melting point, even if the order is for a small number and/or for many kinds of sheets. In addition, since the pre-sheet is cut at the construction stage of FIG. 5, the instrument used to cut the pre-sheet to the desired size is not used to cut the material with a high melting point and so the durability of said instrument is increased.

The ceramic faced base plates 22 are constructed by pressing a powder of ceramics into the form of a plate. The sheet 21 may be placed between adjacent ceramics base plates 22 of a green sheet or ceramics base plates 22, which are stacked in a vertical direction. The sheet 21 may also be placed between the ceramics base plate 22 and a supporting base. The combustible sheet 23 will be incinerated during the firing of the ceramics base plates due to the high temperatures, leaving the powder of ceramics 25 having a high melting point between the ceramics base plates 22 or between the ceramic faced base plate 22 and the supporting base. This remaining powder of ceramics functions to prevent adhesion between the ceramic-faced base plates 22 and adhesion between the ceramics faced base plate 22 and the supporting base.

ment of the present invention. TABLE 2 below shows the results of measurements taken at a span of 80 mm.

TABLE 2

| | Undulations of Ceramics Base Plates | | | | Quality of sheet (%) |
|---|---|---|---|---|---|
| | Max. (microns) | Min. (microns) | R (microns) | x (microns) | |
| Third Embodiment | 25.0 | 5.0 | 20.0 | 15.2 | 95 |
| First Embodiment | 30.6 | 5.9 | 24.7 | 20.2 | 85 |
| Prior Art | 59.7 | 31.3 | 28.4 | 47.0 | 60 |

The sheet 21 of the third embodiment of the present invention has additional advantages. Because the sheet 21 of the third embodiment of the present invention is constructed by coating the first coating layers 24 on both surfaces of the combustible sheet 23 and coating the second coating layer 25 on a surface of at least one of the first coating layer 24, a constant breadth of each of coating layers 24 and 25 may be easily obtained and the construction of sheet 21 is very easy, which results in a decrease in costs. In particular, since the first coating layers 24 include a powder of carbon, the combustible sheet 23 is easily carbonized and the sheet 21 shrinks only to substantially the same extent as the ceramics faced base plates 22. As a result, the adhesion between the peripheral portions of the ceramic faced base plates 22 which takes place in conventional firing of ceramic faced base plates is effectively prevented. Furthermore, since the first coating layers 24 and the second coating layer 25 are each formed separately from the other, the composition in each of the coating layers 24 and 25 is uniform. In the first and second embodiments of the present invention, a non-uniform composition of the coating layer may be obtained when mixing the components of the coating layer, due to the difference in the specific gravities of the powder of ceramics and the powder of carbon. Thus, the quality of the coating layers 24 and 25 of the third embodiment of the present invention is superior in this regard over those of the first and second embodiments. In addition, since the surface of the sheet 21 which may be used in firing ceramic faced base plates according to the present invention is flat, undulations or the formation of pin-holes in the ceramic faced base plates 22 during firing are effectively prevented.

An example of the third embodiment of the present invention is described below.

First coating layers including a powder of carbon were coated on both surfaces of a combustible sheet 23 composed of a pulp paper forming two coating layers 24, each of a 30 micron breadth. A pre-sheet having an 80 micron breadth was obtained. Adhesive layers 26 of acrylic resin were formed on the surface of one coating layer 24. Then, the pre-sheet was cut to a square having the dimensions of 128 mm by 128 mm. Next, the second coating layer 25 comprising a powder of alumina having a grain size of 30 microns was adhered to the surface of the adhesive layer 26 by means of electrostatic coating. The sheets 21 thus constructed were inserted between eight adjacent ceramic faced base plates 22 of alumina green sheet stacked in a vertical direction, each ceramic faced base plate having dimensions of 128 mm by 128 mm and a thickness of 1.2 mm. The ceramic faced base plates 22 were then fired. Undulations of the ceramic faced base plates 22 thus fired were measured and compared with both those of ceramic faced base plates produced according to the prior art method wherein a powder of ceramics was scattered onto the ceramic faced base plates by hand and the first embodiment of the present invention. TABLE 2 below shows the results of measurements taken at a span of 80 mm.

In summary, the third embodiment of the present invention provides a number of advantages, including the following. First, due to the shrinkage-inhibited effect of the first coating layer 24 comprising a powder of carbon, adhesion between the peripheral portions of the ceramic faced baes plates 22 and between the stacked ceramic faced base plates and the supporting base is prevented. Second, due to the constant breadth of the layer of powder of ceramics remaining between the ceramic faced base plates 22, undulations and pin-holes in the ceramic faced base plates 22, formed during firing, are effectively prevented. Third, due to the construction of the sheet 21, wherein the first and second coating layers 24 and 25 of a constant breadth are coated on the combustible sheet 23, the construction of the sheet 21 which may be used in firing ceramic faced base plates according to the present invention becomes easy, resulting in a decrease in costs. Fourth, due to the separate coating of the first and second coating layers 24 and 25, the quality of the coating layers is high. Fifth, cutting the pre-sheet prior to coating the second coating layer 25 on a surface of at least one of the first coating layers 24 increases the durability of the instrument used to cut the pre-sheet to the desired size.

D. FOURTH EMBODIMENT

Figure 6:
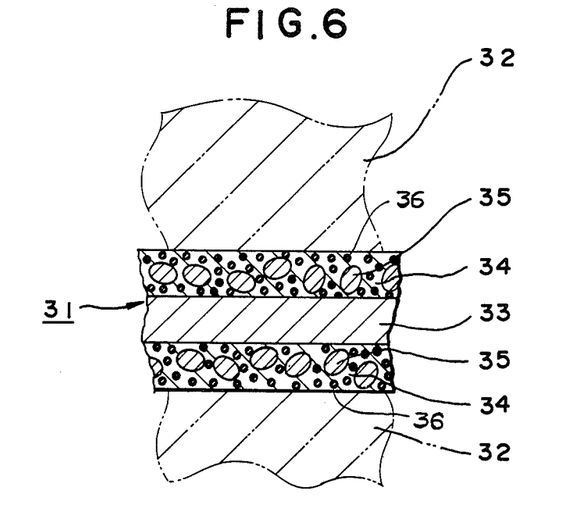
FIG. 6 is a sectional view of a sheet which may be used in firing ceramic faced base plates according to the fourth embodiment of the present invention.

FIG. 6 illustrates a sheet 31 which may be used in firing ceramic faced base plates according to a fourth embodiment of the present invention. According to the fourth embodiment, the sheet 31 is placed between ceramic faced base plates 32 during firing. The sheet 31 comprises a combustible sheet 33 and a coating layer 34 coated on at least one surface of the combustible sheet 33. The coating layer 34 comprises a powder of a material 35 having a high melting point in an amount of 0.5% to 25% by weight, and a powder of carbon 36 in an amount of 5% to 90% by weight, a dispersing agent in amount of 0.1% to 8% by weight, with a binder forming the remainder of the coating layer.

The combustible sheet 33 is preferably constructed of a pulp paper which may be entirely incinerated when the ceramic faced base plates 32 are fired. The combustible sheet 33 may be constructed of combustible plastics, such as polyvinyl alcohol. The coating layer 34 is coated on the surface of combustible sheet 33 to a breadth of, for example, 40 microns. A paste comprising the powder of a material 35 having a high melting point, the powder of carbon 36, the dispersing agent and the binder is coated on the surface of the combustible sheet 33 by means of electrostatic coating or flow dipping coating and then dried to form the coating layer 34. The powder of material 35 with a high melting point has an average grain size of 30-40 microns. The powder of a material 35 is selected either from a ceramics having a high melting point, such as alumina, zirconia, silicon carbide, silicon nitride, aluminum nitride, and boron nitride or a ferrite, such as manganese-zinc and nickel-zinc. The grain size of the powder of carbon 36 is about 0.6 microns. The dispersing agent comprises a surface-active agent. The surface active agent is a fluoric agent, a nonionic agent or an anionic agent. Due to the provision of the dispersing agent, the powder of material 35 with a high melting point may be uniformly dispersed in the coating layer 34 resulting in the provision of an almost unform composition of said layer, which prevents cracking in the coating layer 34 at the time of cutting the sheet 31. The binder comprises a plastic binder, such as an acrylic resin binder and an epoxy resin binder. An explanation regarding the limitations to the above values is provided below.

A powder of material 35 with a high melting point functions to prevent adhesion between the ceramic faced base plates 32 during firing. If the powder of material 35 with a high melting point is included in an amount less than 0 5% by weight in the coating layer 34, the adhesion-preventing effect of the powder of material 35 is no longer satisfactory. If the coating layer 34 comprises the powder of material 35 with a high melting point in an amount greater than 25% by weight, unevenness in the surface of the coating layer 34 increases and the ratio of the powder of carbon 36 to the powder of material 35 in the coating layer 34 decreases, which results in decreasing the effects of the powder of carbon 36 described below.

The powder of carbon 36 functions to carbonize the combustible sheet 33 during firing and to inhibit shrinkage of the sheet 31 to such an extent that the shrinkage rate of the sheet 31 is substantially the same as that of ceramic faced base plates 32. If the coating layer 34 comprises the powder of carbon 36 in an amount less than 5% by weight, the shrinkage-inhibiting effect of the powder of carbon 36 is no longer satisfactory. If the coating layer 34 comprises the powder of carbon 36 in an amount greater than 90% by weight, a uniform dispersion of the powder of material 35 with a high melting point in the coating layer 34 is difficult to obtain.

The dispersing agent functions to uniformly disperse the powder of material 35 with a high melting point and the powder of carbon 36 in the coating layer 34. If the coating layer 34 comprises the dispersing agent in an amount less than 0.1% by weight, its dispersing effect is unsatisfactory. If the coating layer 34 comprises the dispersing agent in an amount greater than 8% by weight, the dispersing agent has an undesirable effect on the ceramic faced base plates 32.

The sheet 31 thus constructed is placed between adjacent ceramic faced base plates 32 which are stacked in a vertical direction or between the ceramic faced base plate 32 and a supporting base used to support the stacked ceramic faced base plates 32 during firing. The combustible sheet 33 will be incinerated during firing, leaving the powder of material 35 with a high melting point. This remaining powder of material 35 with a high melting point functions to prevent adhesion between the ceramic faced base plates 32 and the supporting base. The powder of carbon 36 inhibits shrinkage of the sheet 1 during firing and prevents adhesion between the peripheral portions of the ceramic faced base plates 32 and between the ceramic faced base plates 32 and the supporting base. The coating of the coating layer 34 on the surface of the combustible sheet 33 assures a constant breadth of the layer of powder of material 35 remaining during firing and a high quality of the fired ceramic faced base plates 32 having minor undulations and few pin-holes, and further enables the easy construction of easy construction of sheets 31.

The fourth embodiment of the present invention has additional advantages. Due to the dispersing agent, the powder of material 35 is uniformly dispersed in the coating layer 34, which results in effective prevention of cracking in the coating layer 34 and easy cutting of the sheet 31 without severely decreasing the durability of the instrument used to cut the sheet 31. In addition, only a small amount of the powder of material 35 with a high melting point remains on the surface of ceramic faced base plates 32 following firing and so the removal of the remaining powder is easy.

Examples of the fourth embodiment of the present invention are described below.

Coating layers 34 having the compositions shown in TABLE 3 were coated by means of impregation coating on both surfaces of a combustible sheet 33 composed of pulp paper having a 40 micron thickness. The coating layers thus forming, each of a 40 micron thickness, were then dried. The sheets 31 thus constructed were inserted between eight adjacent ceramic faced base plates 32 of alumina green sheets stacked in a vertical direction, each ceramic faced base plate 32 having a thickness of 1.2 mm. Undulations of the fired ceramic faced base plates 32 were measured after firing and were compared with those of a comparison example having the compositions shown in TABLE 3. The comparison example corresponds to the first embodiment of the present invention. TABLE 3 below shows the results of measurements of undulations taken at the span of 80 mm.

TABLE 3

| Undulation of Ceramics Base Plates | | | | |
|---|---|---|---|---|
| COMPOSITIONS | | | | |
| Example 1 | Example 2 | Example 3 | Example 4 | Comparison |
| Powder of material 35 having a high melting point | | | | |
| Alumina of 35 micron size 10% | Alumina of 35 micron size 3% | Alumina of 35 micron size 20% | SiC 15% | Alumina 55% |
| Powder of carbon 36 of 0.6 micron size | | | | |
| 62.5% | 70% | 30% | 50% | 35% |
| Dispersing Agent | | | | |
| Fluoric surface-active agent 1.5% | Fluoric surface-active agent 3.0% | Nonionic surface-active agent 4.5% | Nonionic surface-active agent 6% | None |
| Binder | | | | |
| Acryl resin 26% | Acryl resin 24% | Epoxy resin 45.5% | Epoxy resin 29% | Acryl resin 10% |
| Undulations Maximum: micron | | | | |
| 28.0 | 25.0 | 29.0 | 26.3 | 30.6 |
| Minimum: micron | | | | |
| 5.5 | 4.8 | 5.0 | 6.0 | 5.9 |
| R: micron | | | | |
| 22.5 | 20.2 | 24.0 | 20.3 | 24.7 |
| x: micron | | | | |
| 17.8 | 18.3 | 17.0 | 18.7 | 20.2 |

In summary, the fourth embodiment of the present invention provides a number of advantages including the following. First, due to the shrinkage-inhibiting effect of the powder of carbon 36, adhesion between the ceramic faced base plates 32 which takes place in conventional firing is prevented. Second, due to the constant breadth of the layer of powder of material 36 with a high melting point remaining between the ceramic faced base plates 32, undulations and pin-holes in the ceramic faced base plates 32, formed during firing, are effectively prevented. Third, due to the construction of the sheet 31 wherein the coating layer 34 of a constant breadth is coated on the combustible sheet 33, the construction of the sheet 31 is easy, resulting in a decrease in costs. Fourth, due to the dispersing agent, the coating layer 34 is uniform in composition and cracking in the coating layer 34 at the time of cutting the sheet 31 is prevented, increasing the durability of the instrument used to cut the sheet 31.

Although only four preferred embodiments of the present invention have been described in detail, it will be appreciated by those skilled in the art that various modifications and alterations can be made to the particular embodiments shown without materially departing from the novel teachings and advantages of the invention. Accordingly, it is to be understood that all such modifications and alterations are included within the scope of the invention as defined by the following claims.

What is claimed is:

1. A sheet suitable for use in firing ceramic faced base plates, said sheet being placed between said ceramic faced base plates during firing, said sheet comprising:
   a combustible sheet; and
   a coating layer coated on at least one surface of said combustible sheet, said coating layer comprising (a) 25% to 90% by weight of a powder of ceramics having a high melting point selected from the group consisting of $Al_2O_3$ and $ZrO_2$ and (b) 5% to 70% by weight of a powder of carbon.

2. The sheet according to claim 1 wherein said combustible sheet comprises a pulp paper.

3. The sheet according to claim 1 wherein said combustible sheet comprises a sheet of combustible plastic consisting of polyvinyl alcohol.

4. The sheet according to claim 1 wherein said powder of ceramics and said powder of carbon are mixed with an organic binder.

5. The sheet according to claim 4 wherein said organic binder is included in an amount of 5% to 30% by weight in said coating layer.

6. The sheet according to claim 4 wherein said organic binder comprises an acrylic resin binder.

7. The sheet according to claim 1 wherein said coating layer is coated on each surface of said combustible sheet.

8. A sheet suitable for use in firing base plates constructed by pressing a powder of one of ceramics, glass, and metal into the form of a plate, said sheet being placed between said base plates during firing, said sheet comprising:
   a combustible sheet; and
   a coating layer coated on at least one surface of said combustible sheet, said coating layer comprising (a) 25% to 90% by weight of a powder of at least one kind of ceramics selected from the group consisting of nitride, carbonide, and ferrite and (b) 5% to 90% by weight of a powder of carbon.

9. The sheet according to claim 8 wherein said nitride is selected from the group consisting of BN, AlN, and $Si_3N_4$.

10. The sheet according to claim 8 wherein said carbonide comprises SiC.

11. The sheet according to claim 8 wherein said ferrite is selected from the group consisting of Mn-Zn type ferrite and Ni-Zn type ferrite.

12. The sheet according to claim 8 wherein said combustible sheet comprises a pulp paper.

13. The sheet according to claim 8 wherein said combustible sheet comprises a sheet of combustible plastic consisting of polyvinyl alcohol.

14. The sheet according to claim 8 wherein said powder of ceramics and said powder of carbon are mixed with an organic binder.

15. The sheet according to claim 14 wherein said organic binder is included in an amount of 3% to 30% by weight in said coating layer.

16. The sheet according to claim 14 wherein said organic binder comprises acrylic resin.

17. The sheet according to claim 8 wherein said coating layer is coated on each surface of said combustible sheet.

18. A sheet suitable for use in firing ceramic faced base plates, said sheet being placed between said ceramic faced base plates during firing, said sheet comprising:
   a combustible sheet;
   first coating layers comprising a powder of carbon coated on both surfaces of said combustible sheet; and
   a second coating layer comprising a powder of material with a high melting point coated on a surface of at least one of said first coating layers.

19. The sheet according to claim 18 wherein said combustible sheet comprises a pulp paper.

20. The sheet according to claim 18 wherein said combustible sheet comprises a sheet of combustible plastic consisting of polyvinyl alcohol.

21. The sheet according to claim 18 wherein said first coating layers consist of the powder of carbon and a binder.

22. The sheet according to claim 18 wherein the breadth of each of said first coating layers is 15-50 microns.

23. The sheet according to claim 18 wherein said second coating layer is adhered via an adhesive layer of resin selected from the group consisting of acrylic resin and epoxy resin to a surface of at least one of said first coating layers.

24. The sheet according to claim 18 wherein said material with a high melting point is a ceramics selected from the group of alumina, zirconia, silicon carbide, silicon nitride, aluminum nitride and boron nitride.

25. The sheet according to claim 18 wherein said material with a high melting point is a ferrite selected from the group of manganese-zinc and nickel-zinc.

26. A sheet suitable for use in firing ceramic faced base plates, said sheet being placed between said ceramic faced base plates during firing, said sheet comprising:
   a combustible sheet;
   a coating layer coated on at least one surface of said combustible sheet, said coating layer comprising (a) a powder of a material with a high melting point in an amount of 0.5% to 25% by weight, (b) a powder of carbon in an amount of 5% to 90% by weight, (c) a dispersing agent in an amount of 0.1 to 8% by weight, and (d) a binder occupying a remaining portion.

27. The sheet according to claim 26 wherein said dispersing agent is a surface-active agent.

28. The sheet according to claim 26 wherein said binder ia a synthetic resin binder.

29. The sheet according to claim 26 wherein said combustible sheet comprises a pulp paper.

30. The sheet according to claim 26 wherein said combustible sheet comprises a sheet of combustible plastic consisting of polyvinyl alcohol.

31. The sheet according to claim 26 wherein said coating layer is coated on said combustible sheet by means of one of flow dipping coating, electrostatic coating and dipping coating and then dried.

32. The sheet according to claim 26 wherein said material with a high melting point is a ceramics with a high melting point selected from the group of alumina, zirconia, silicon carbide, silicon nitride, aluminum nitride and boron nitride and the average particle size of said powder of a material with a high melting point is 30–40 microns.

33. The sheet according to claim 26 wherein said material with a high melting point is a ferrite selected from the group consisting of manganese-zinc and nickel-zinc.

34. The sheet according to claim 27 wherein said surface-active agent is an agent selected from the group consisting of a fluoric agent, a nonionic agent and an anionic agent.

35. The sheet according to claim 26 wherein said binder comprises plastics selected from the group consisting of acrylic resin and epoxy resin.

* * * * *